Patented Jan. 8, 1952

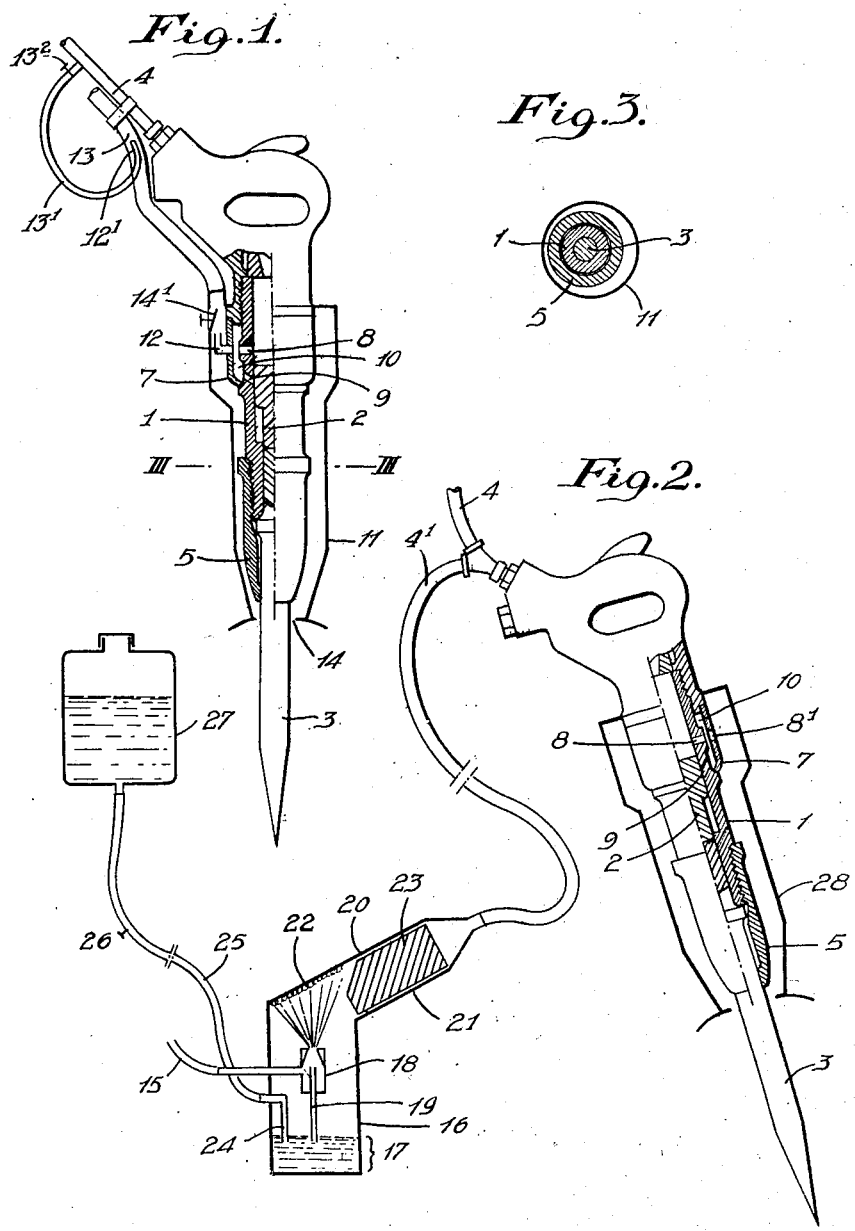

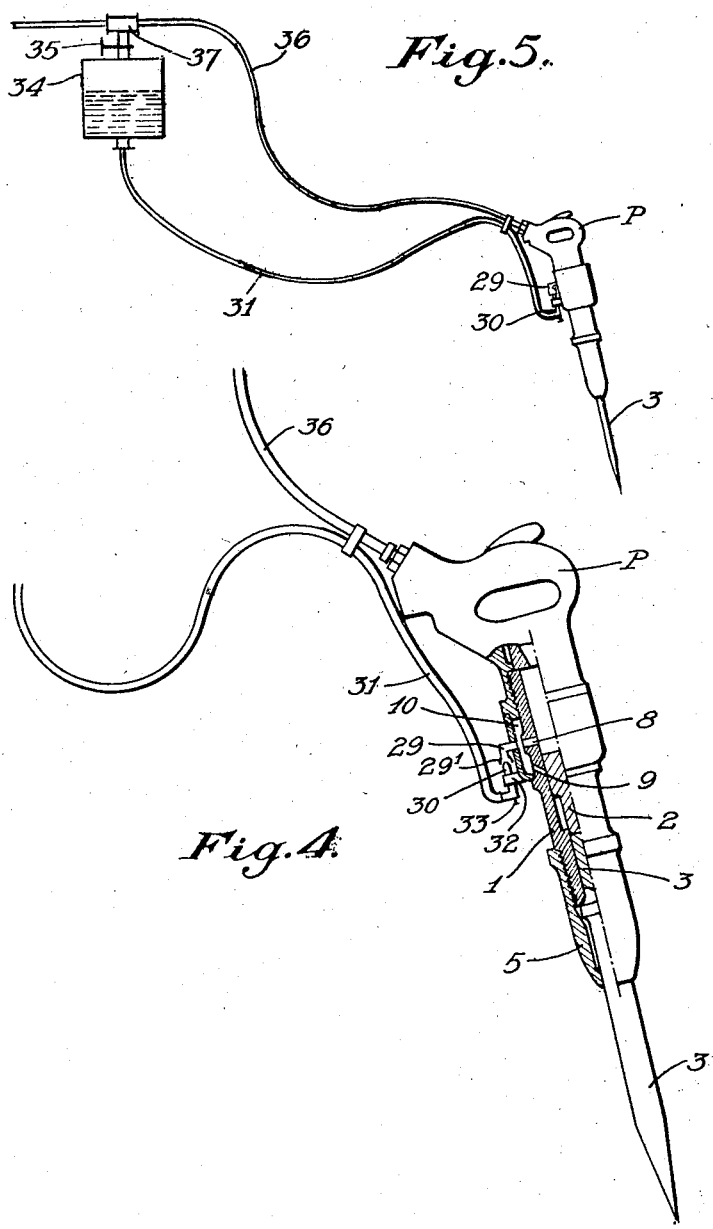

2,581,943

UNITED STATES PATENT OFFICE 2,581,943

MEANS FOR ELIMINATING DUST PRODUCED BY PNEUMATIC DRILLS

Lucien Adolphe Jean-Baptiste Dautrebande, Rhode-Saint-Genese, Belgium, assignor to Aerosol Corporation of America, New York, N. Y., a corporation of Delaware Application November 29, 1946, Serial No. 713,058
In Belgium November 30, 1945

4 Claims. (Cl. 255—49)

My present invention relates to the elimination of dust produced by pneumatic apparatus such as piercing tools, pneumatic drills, drilling machines, and similar devices.

It is known that all pneumatic apparatus functioning on friable material automatically produces a certain amount of dust. The amount produced is in proportion to the volume flow of air at a given pressure from the apparatus.

The dust produced tends to remain in the atmosphere and causes many inconveniences from the point of view of the efficiency of the work being performed. The dust is the more injurious the finer it becomes.

In the mines the recovery or elimination of the dust usually has been made by ventilating galleries and by certain imperfect practices at the source of dust formation.

According to the present invention these inconveniences are remedied in that dust is eliminated by recuperation, removal, settling, etc., at the source itself and by the functioning of the pneumatic apparatus which generates the dust.

The pneumatic drill apparatus for example, may be surrounded by a sheath or supplementary arrangement in which is provided an aspirating jet connected to the outlet of the compressed air after expansion within the drill, which jet acts to effect a suction within the sheath and so draw in the dust as formed and thus to eliminate it by aspiration to a degree dependent on its production. It may be so removed by preference as far as possible by a system of pipes connected to this sheath.

The dust within the zone of suction is treated by aerosols obtained from an adequate generating solution and suitable for producing precipitation, fixation or neutralisation of the dust produced by the operation of the pneumatic apparatus. In this connection the compressed air serving to operate the apparatus may be, before its introduction, charged with liquid or solid aerosols. The air thus charged emerges in the sheath from the pneumatic instrument through the orifices normally provided for its escape or through said jet. The desired aerosol as subsequently disclosed may also be formed within or on the body of the drill during the percussion movement and released into the immediate atmosphere around the user.

In order to further illustrate the invention the following non-limitative examples and accompanying drawings are set forth.

Figs. 1 and 2 each show my invention as applied to a pneumatic drill and utilizing an external source of aerosols and a sheath.

Fig. 3 is a section on the line III—III of Fig. 1.

Fig. 4 illustrates my invention as applied to a pneumatic drill and utilizing an integral source of aerosol.

Fig. 5 is a further showing of the apparatus of Fig. 4 illustrating the source and control of the liquid to be dispersed.

In Fig. 1, the cylinder 1 of the drill carries a piston 2 which acts in the well known manner by percussion on a drill bit 3. Compressed air is supplied to the pneumatic drill by a flexible tube 4. The apparatus has the nose 5 and the escape screen 7. The air escapes from the cylinder 1 and emerges through openings 8 and 9 into a space 10.

According to this embodiment of the invention the drill is surrounded over almost the entire length of the cylinder by a supplementary sheath 11. Within the sheath 11 there is an aspirating jet 12 attached to the outlet in screen 7 for the compressed air after expansion.

The air is directed by means of the aspirating jet 12 into a tube 13 which is connected to the sheath 11. The aspirating action or suction which takes place in the space comprised between the sheath 11 and cylinder 1 of the drill is particularly felt at 14 at the point where the dust is produced. The dust is drawn into the sheath 11 and is carried away by the air passed along the tube 13.

The tube 13, if desired, can surround concentrically the tube 4 for bringing in the compressed air.

Furthermore, the sheath 11 is not necessarily brought as far as the drill bit 3 but can stop below the part of the cylinder where are located the escape apertures.

Compressed air in the tube 4 operates the apparatus of Fig. 1 and is charged before its introduction into the apparatus, with particles forming a dispersion, of liquid, viscous material, foam, wetting agent or pulverised solid. Aerosols obtained for example by dispersion of liquid by means of a gas are preferred. As a solid material, aluminium powder or hydrate can be cited.

The dust is agglutinated during the passage through the outlet tube 13. Furthermore the precipitating coating, sticking, enrobing or neutralising particles which have not yet been fixed on the particles of dust can be utilised at the exit of the tube 13 to participate in the sterilization of the general atmosphere.

This principle is useful for the recovery and fixing of dust not only at the source but also in case of need for the supply of aerosols into the atmosphere situated at a distance from the pneumatic drill and especially for humidifying all dust or potential dust at storage, loading, sorting and crushing points.

As shown in Fig. 3 the axis of the cylinder 1 of the drill does not need to coincide with that of the sheath 11 and the spacing of the sheath opposite the aspirating jet 12 is greater.

The aspirating tube 13 should be larger than the inlet tube for the compressed air. A screw controlled valve 14' permits of regulating the intensity of the aspiration according to variation in the functioning of the drill.

According to the invention, as shown in Fig. 2, part of the compressed air coming from a suitable source passes through a tube 15 in its trajectory towards the drill and through an aerosol producing device 16 containing at 17 a solution or a suspension to be dispersed. This liquid can advantageously be utilised simultaneously as a lubricant.

Within the aerosol producing device there is an atomising jet represented diagrammatically at 18 provided with an air inlet (15) and a liquid inlet (tube 19).

The cloud formed at the outlet of the jet 18 is advantageously submitted to a stabilisation process for the small particles by selection and for this purpose can be directed on an inclined surface 20 and block 23 which is the interior wall of the outlet tube 21 and which gives rise at 22 and 23 to the formation of a continuous liquid film which acts as described in my copending United States patent application, Serial No. 701,216, namely, as a selection agent whereby the particles which have not reached the requisite degree of stability to traverse the liquid layer are returned to the mother solution.

Other selection means and suitably such means described in said co-pending patent application can be used.

A tube 4' connects the outlet tube 21 with the tube 4 and the aerosols mix with the air brought by the tube 4.

It is preferably arranged that the quantity of liquid contained in the aerosol producing device is always constant as this avoids the necessity of recharging the aerosol producing device and renders the arrangement automatic.

For this purpose a tube 24 situated within the aerosol producing device 17 is used, the outlet for which is below the level of the liquid corresponding to the minimum quantity of liquid the presence of which is required or necessary.

This tube outside the apparatus is connected through a flexible tube 25 having a tap 26 to a hermetically sealed vessel 27 so that when the level of the liquid in the aerosol producing device is low there is produced an automatic flow of liquid from the reservoir 27 towards the layer 17.

If desired, the air thus charged with aerosols on emerging from the instrument expands into the atmosphere in the immediate vicinity of the user and can serve for the precipitation and fixing of the dust raised by the action of the pneumatic drill. This air in the majority of cases emerges by the orifices 8 and 9 which are provided of necessity within the body of the drill and the percussion movement. It is therefore possible to arrange that all the air emerging from a pneumatic drill or any other type of pneumatic apparatus is charged with effective concentrations of neutral liquids, viscous liquids, precipitates or neutralising agents. The neutralisation is especially necessary for removing dust which undergoes chemical reaction with the particles or the droplets selected.

In Figs. 1 and 2, like reference numerals refer to like parts.

In the embodiment according to Fig. 2 there is no jet 12 to act as an aspirator and no withdrawing tube 13. The supplementary sleeve 28 gathers after expansion, all the compressed air charged with aerosols emerging at 8' and directs it towards the outside along the axis of the pneumatic drill so as to permit the fixation of all the dust at the point where it is formed by the drill bit 3.

The same principle can be adapted for the hollowing out of openings or other galleries or for all other types of public work (demolition, concrete breaking, crushing, etc.).

Similarly in apparatus in which water is used to fix the dust a current of air can be replaced by a jet of aerosols issuing from suitable solutions notably froths. This method of procedure avoids a dangerous increase in the moisture content of the air, fixes the dust of all shapes and only requires a minimum quantity of liquid.

Fig. 4 relates to a variation of the embodiment based on a cooperation with the exit of the air of a tube supplied with water or other liquid under pressure whereby a cloud of aerosols is formed which is directed towards the source of the dust.

The pneumatic drill may be provided at its periphery with a tube 29 fitted over the escape aperture for the air and directing the air by means of a small cup 29' away from the hand grip P. Through this tube there passes part or preferably the whole of the air coming from the drill.

Opposite the outlet for the air there is provided a water jet or jet of another liquid preferably under pressure. The jet is provided with a tapered orifice at the extremity of a short rigid tube 30 to which is attached a flexible tube 31 for bringing in the water. The rigid tube 30 is carried by the body of the drill for example with the aid of a ring 32.

The tube 31 can also be connected to a source supplied with any other liquid, viscous or solid material (aluminium powder or hydrate), (also foams, wetting agents, etc.).

The distance between the outlet tube for the air and that for the water or other material can be regulated for example with the aid of a screw 33 acting to move the tube 30.

Under suitably regulated conditions the air and water upon meeting form a cloud of aerosols which may be directed along the axis of the cavity formed by the drill 3.

The pressure of water supplied by the tube 31 should be regulated by appropriate means so as to prevent the penetration of water into the body of the drill and to obtain an optimum pulverisation at the outlet of the air from the drill. This optimum depends equally on the regulation of the relative positions of the tubes 29 and 30.

The liquid under pressure as in Fig. 5 advantageously can be provided by a vessel 34 at the base of which is connected the flexible tube 31. Into this vessel is introduced as a pressure agent, compressed air from a source which is independent or connected by a tube 37 with the common conduit 36 supplying the compressed air for the operation of the drill.

A tap can be provided at 35 for regulating the pressure of the air acting on the liquid in the flask 34. There is thus provided a means for regulating the pressure of the liquid.

The liquid can comprise viscous, sticking, froths, neutralising solutions, etc., according to the nature of the dust desired to be controlled.

What I claim is:

1. A device for eliminating air-borne dust generated by the operation of a pneumatic drill comprising, in combination, means for the production of an aerosol, means for mixing aerosol with compressed air, means for charging the drill mechanism with aerosol-compressed air mixture to operate the same, a sheath surrounding said drill mechanism, defining a space therebetween and having an annular opening at the lower end thereof, and exhaust means connecting said drill mechanism with the space within said sheath for introducing aerosol-air mixture therewithin and arranged to direct a flow of aerosol therewithin for bringing the aerosol into contact with the dust.

2. A device in accordance with claim 1 in which the sheath is provided with a second opening at its other end and the exhaust means is arranged to direct a flow of aerosol-air mixture towards and out said opening to suck air-borne dust into the space between the sheath and the drill mechanism through the first-mentioned annular opening of the sheath.

3. A device in accordance with claim 1 in which the exhaust means connects said drill mechanism with the space within said sheath for introducing aerosol-compressed air mixture therewithin is arranged to direct a flow of aerosol out said annular opening.

4. A device for eliminating air-borne dust generated by the operation of a pneumatic drill, comprising, in combination, means for the production of an aerosol, means for mixing aerosols with compressed air, means for charging the drill mechanism with aerosol-compressed air mixture to operate the same, a sheath surrounding said drill mechanism, defining a space therebetween and having an annular opening at the lower end thereof and a second annular opening at the upper end thereof, exhaust means connecting said drill mechanism with the space within said sheath for introducing aerosol-compressed air mixture therewithin and arranged to direct a flow of aerosol-compressed air mixture towards and out said second opening to suck air-borne dust into the space between the sheath and the drill mechanism through the first-mentioned annular opening of the sheath, and an inlet tube for compressed air directed into said sheath adjacent the second opening to assist in driving aerosol-compressed air-dust mixture out the second opening, the second opening in the sheath being larger in diameter than the inlet tube for compressed air.

LUCIEN ADOLPHE JEAN-BAPTISTE DAUTREBANDE.

REFERENCES CITED

The following references are of record in the file of this patent:

UNITED STATES PATENTS

| Number | Name | Date |
| --- | --- | --- |
| 981,409 | Goodspeed | Jan. 10, 1911 |
| 1,084,152 | Kessel | Jan. 13, 1914 |
| 1,223,027 | Brackett | Apr. 17, 1917 |
| 1,334,430 | Ayotte | Mar. 23, 1920 |
| 2,009,066 | Mitchell | July 23, 1935 |

OTHER REFERENCES

Publication by American Cyanamid & Chemical Corp., "Aerosol Wetting Agents," 1941.